Nov. 15, 1966    KEIZO TSUGAWA    3,285,089
DRIVE MECHANISM FOR A SHUTTER WINDING DEVICE
Filed April 13, 1964    2 Sheets-Sheet 2

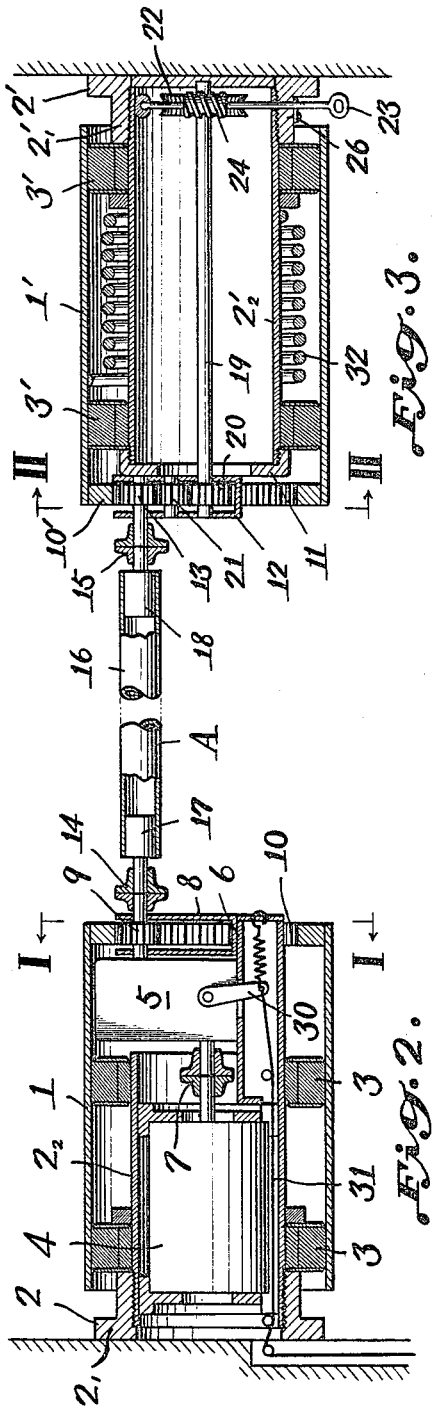
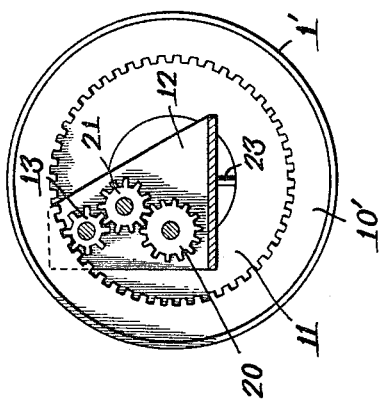
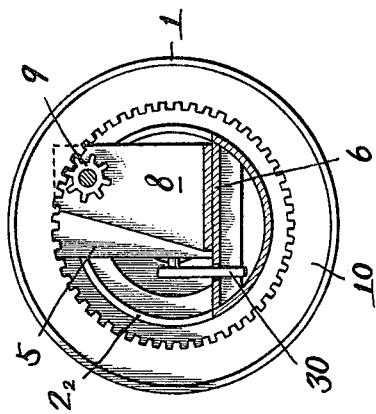

INVENTOR
KEIZO TSUGAWA

# United States Patent Office 3,285,089
Patented Nov. 15, 1966

3,285,089
DRIVE MECHANISM FOR A SHUTTER
WINDING DEVICE
Keizo Tsugawa, Tokyo, Japan, assignor to Nihon Bunka
Roller Shutter Company, Limited, Tokyo, Japan
Filed Apr. 13, 1964, Ser. No. 359,264
6 Claims. (Cl. 74—421)

This invention relates to a shutter winding device and has particular reference to a real mechanism of a cylindrical type capable of lifting and lowering a steel curtain shutter in a building.

Conventional devices of this type comprise a motor-driven, rotating cylinder having attached thereto an upper marginal portion of a flexible shutter member. As such cylinders were built initially as one-piece units in most cases, it was difficult to adjust their length to varying field installation requirements. Therefore, it was hitherto necessary to design and build each individual cylinder unit in conformity with the specific field measurement, which necessitated the use of a number of different tooling machines and implements and, hence, it was impossible to perform such work at the installation site. Furthermore, it was not easy to transport and install such heavy units. The more serious problem of such cylindrical shutter winders was that, during a winding operation, the cylinder, being one-piece, was susceptible to torsion or bending due to load applied by the shutter. Replacement of the defective cylinder and its associated parts was indeed troublesome and extremely difficult, so that the whole unit had to be removed and repaired. Another disadvantage of the single-unit cylinder is the increased operating noise due to echo within the cylinder. Manufacturing difficulties and, hence, prolonged delivery terms add to the disadvantages of such conventional cylindrical shutter winding apparatus.

It is the principal object of this invention to provide a shutter winding apparatus which will eliminate the above noted difficulties.

It is another object of the invention to provide improved shutter winding apparatus of a prefabricated type which may be readily adapted to any given limitations of field installation.

It is a further object of the invention to provide a novel shutter winding apparatus of the type designed with component parts which may be easily interchanged or replaced.

It is still another object of the invention to provide a cylindrical shutter winding device of the type which develops little or no noise during operation and which may be manufactured at a minimum cost and time thereby permitting quantity production thereof.

The characteristic feature of the invention resides in the use of two relatively short cylindrical winding members or drums which are mounted rotatably on respective bases. These two cylindrical members are furthermore arranged coaxially and in axially spaced opposed relation, and are interconnected for conjoint rotation by a connecting rod or pipe connected to the respective cylinders through suitable couplings. Either of the two cylinders or drums may be motor driven.

In a preferred embodiment of the invention, there are provided additional cylindrical members of smaller length, hereinafter referred to as "internal cylinders," which are mounted respectively within the first-mentioned cylinders, hereinafter referred to as "external cylinders." Either of the two internal cylinders is provided therein with a drive motor. The rotation of the motor is transmitted to the associated external cylinder through a reduction gear and clutch mechanism associated with the internal cylinder supporting the motor. The other internal cylinder is provided therein with a manually operated rotary driving device, and a spring member adapted to balance the weight of the shutter. The connecting rod or pipe which connects the two sets of cylinders is so arranged as to rotate faster than the cylinders or drums.

The above objects and features of the invention will be more fully understood from the following description taken in conjunction with the accompanying drawings in which:

FIG. 1 is an elevational view partly in section of the shutter winding device embodying the present invention;

FIG. 2 is a cross-sectional view taken on the line I—I of FIG. 1;

FIG. 3 is a cross-sectional view taken on the line II—II of FIG. 1 and

Figure 4:
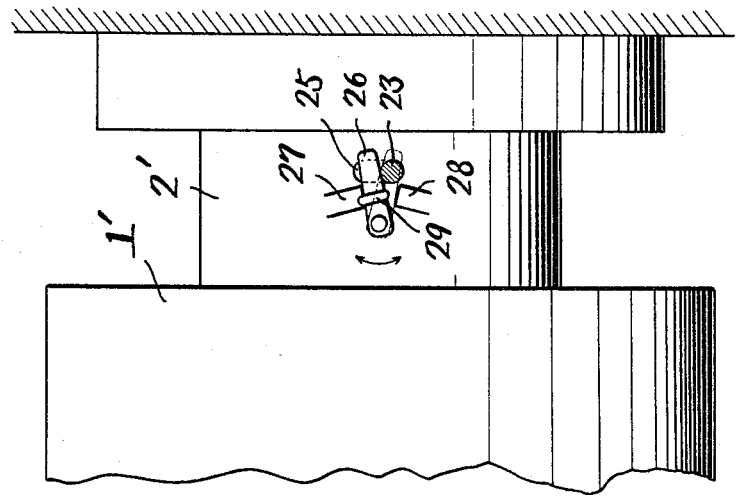
FIG. 4 is an enlarged bottom view of the device shown in FIG. 1.

Referring t othe drawings, the shutter winding device of the present invention includes a pair of relatively large diameter external cylinders or drums 1, 1' rotatably mounted on respective support members or bases 2, 2' with the interposition of bearings 3, 3'. Bases 2, 2' have cylindrical legs or trunnions $2_1$ and $2'_2$, respectively, connected with internal cylinders $2_2$ and $2'_2$, respectively, as by threaded interengagement therewith. The bearings 3, 3' are interposed between the internal cylinders and respective external cylinders.

A reversible electric motor 4 is mounted within one of the internal cylinders $2_1$, $2_2$, and in the particular embodiment of the invention illustrated in the drawings, motor 4 is mounted within the internal cylinder $2_2$. A combined speed reducer and clutch mechanism 5 is mounted on a support 6 fixed to internal cylinder $2_2$, the end wall of cylinder $2_2$ being partially cut away to accommodate reduction gearing and clutch mechanism 5. A coupling 7 connects the input shaft of mechanism 5 to the output shaft of motor 4, and the output side of mechanism 5 bears against a support plate or housing 8 which is supported on the output shaft of mechanism 5, this output shaft having a spur gear 9 fixed thereon. The external cylinders 1, 1' are provided at the inner periphery with equally toothed internal gear wheels 10, 10', respectively, one of which wheels 10 is in mesh with the spur gear 9.

A cover or closure 11 is secured to the inner end of internal cylinder $2'_2$, and a support plate or housing 12 is fixed to cover or closure 11 and rotatably supports a shaft to which is fixed a spur gear 13 meshing with internal gear 10'. The number of teeth of spur gear 13 is equal to that of the spur gear 9.

A tubular connecting shaft or pipe A is interposed between drums or cylinders 1 and 1', and has secured in its ends fittings or bushings 17 and 18 each of which has a shaft extending outwardly therefrom. The shaft of bushing 17 is connected by a coupling 14 to the shaft supporting spur gear 9, and the shaft of bushing 18 is connected by a coupling 15 to the shaft supporting spur gear 13. By virtue of the construction described so far, it will be clear that the external cylinders or drums 1 and 1' are rotated in synchronism with each other, and that the shaft A is rotated at a much higher speed than are the drums 1 and 1'. Thus, the load applied to connecting shaft A is reduced substantially due to the gear ratio, so that the unit as a whole can withstand a relatively large load.

A shaft 19 extends substantially coaxially of internal cylinder $2'_2$, and one end of this shaft extends into the housing or plate 12 and has secured thereto, within this housing, a spur gear 20 meshing with the spur gear 21, mounted in the housing 12, and which, in turn, meshes with the spur gear 13. The other end of shaft 19 has secured thereto a worm gear 22 which may be engaged with a worm 24 by operation of a manually operated handle or shaft 23, shaft 23 being displaceable either to engage worm 24 with worm gear 22 or to disengage worm 24 from worm gear 22.

Referring to FIGS. 1 and 4, manually operable shaft 23, which is pivoted at one end in internal cylinder $2'_2$, has its outer end extending through an elongated slot 25 through the leg $2'_1$ of support base 2'. A latch 26 is pivotally and displaceably mounted on the outer surface of leg 2' and is arranged to maintain shaft 23 in either of the two limiting positions in groove 25, the latch 26 bearing, in each position, against an abutment 27 or 28. A ring 29 is provided for lifting and swinging the latch 26.

Normally, worm wheel 22 and worm 24 are disengaged but, in the event of power failure or failure of motor 4 to operate, ring 29 may be manually grasped to displace pivoted strip 26 outwardly and allow shaft 23 to be moved to a position wherein worm wheel 22 is engaged by worm 24. Shaft 23 may then be rotated by its handle so that cylinders or drums 1 and 1' will be rotated through shaft 19, spur gear 20, spur gear 21, and spur gear 13, and the mechanism interconnecting the two drums.

A clutch operating lever 30 projects from reduction gearing and clutch mechanism 5, and a wire 31 is secured to lever 30 and trained over pulleys to a suitable place where it may be manually manipulated to operate clutch lever 30. Clutch lever 30 is biased to the position shown in FIG. 1 by a tension spring connected between the outer end of the clutch lever and the support 6.

A torsion spring 32 is disposed between drum 1' and internal cylinder $2'_2$, and the left end of torsion spring 32, as viewed in FIG. 1, is connected to drum 1' while the right end of spring 32 is connected to internal cylinder $2'_2$. Spring 32 acts in the nature of a balancing means, being wound up for storage of energy during lowering of a curtain and unwinding, to release its stored energy, during lifting of a curtain.

With the described construction, a winding type shutter (not illustrated) may be secured at the upper end thereof to the cylinders 1, 1'. On starting the motor 4, the cylinder 1 begins to rotate through the reduction gearing and clutch unit 5, and simultaneously the other cylinder 1' is rotated in synchronism in cylinder 1, through the connecting shaft A. In this manner, the shutter may be wound on or unwound from the cylinders 1, 1' according to the direction in which the motor 4 rotates. When the curtain is being unwound from drums 1 and 1', spring 32 is wound up to store energy, which energy is released, during unwinding of spring 32 as the curtain is wound up on drums 1 and 1', to assist in raising the curtain. In the event of power failure or when the motor is inoperative, the manually operated shaft 23 may be moved to operating position, as already discussed, and rotated by its handle, thereby accomplishing the lifting or lowering of the shutter as desired. Alternatively, the clutch wire 31 may be pulled thereby to disengage the clutch mechanism, so that the cylinders 1, 1' will rotate freely and disconnected from motor 4. The shutter may then be lifted or lowered by hand.

From the foregoing description of the shutter winding apparatus, it will be understood that the cylinders 1 and 1' may be mounted separately and the distance therebetween may be determined by the length of the connecting shaft A selected. Because of the nature of the connecting shaft A, this may be easily fabricated at the job site to meet any dimensional requirements for installation of the shutter winder of the invention. The unit may be initially dismantled for ease of transport and may be readily interchanged for any defective component parts.

The technical advantage of the invention is that there is little or no objectionable noise developed during the operation of the shutter winder which would otherwise be produced in the conventional solid-piece cylinder device. The time for the manufacture and delivery required for the apparatus of the invention can be considerably reduced; it may perhaps take an average of 3 days as against the usual 3 to 4 months of delivery encountered with the prior art devices.

From the foregoing, the construction and operation of the device will be readily understood and further explanation is believed to be unnecessary. However, since a number of modifications and changes will readily occur to those skilled in the art, it is not desired to limit the invention to the precise construction shown and described, and accordingly, all suitable modifications and equivalents may be resorted to, without departing from the scope of the appended claims.

What is claimed as new is as follows:

1. A shutter winding device comprising, in combination, a pair of coaxial, axially spaced, relatively large and substantially equal diameter drums arranged to have a curtain wound thereon and unwound therefrom and having a combined axial length less than the width of the curtain to be operated thereby; support base means, including bearing means rotatably supporting each of said drums; a motor mounted within one of said drums on the associated base means and in driving connection with said one drum; coupling means, each secured to a respective drum for rotation thereby and extending toward the other drum; and a relatively small diameter shaft connected at opposite ends to both coupling means to interconnect said drums for conjoint and synchronized rotation, the length of said shaft being selected in correspondence with the width of curtain to be secured to said drums.

2. A shutter winding device, as claimed in claim 1, including a pair of supports each secured to a respective support base means within the associated drum; said motor being mounted on the support within said one drum; and a reduction gearing and clutch mechanism mounted on the support within said one drum and drivingly interposed between said motor and the coupling means associated with said one drum.

3. A shutter winding device, as claimed in claim 2, including manual operating means mounted on the support within the other drum, said manual operating means being in driving connection with said other drum and have an operating member projecting externally of said other drum; said manual operating means including a pair of driving members selectively engageable and disengageable by said operating means.

4. A shutter winding device, as claimed in claim 2, in which said reduction gearing and clutch mechanism includes a clutch disengaging lever extending therefrom; and a clutch operating wire connected to said lever and extending externally to said one drum for selective manual disengagement of the clutch of said reduction gear and clutch mechanism.

5. A shutter winding device, as claimed in claim 1, including a torsion spring extending substantially coaxially within one of said drums and having one end secured to the associated drum and the other end secured to the associated support base means; said torsion spring being wound; to store energy, upon unwinding of a curtain from said drums and unwinding, to release the stored energy, upon winding of a curtain on said drums.

6. A shutter winding device, as claimed in claim 1, including reduction gearing interposed between each drum and its associated coupling means and having a gear ratio such that said shaft is rotated at an angular velocity substantially in excess of the angular velocity of said drums.

References Cited by the Examiner
UNITED STATES PATENTS

| | | | |
|---|---|---|---|
| 1,313,537 | 8/1919 | Jones. | |
| 2,736,209 | 2/1956 | Christian | 74—421.5 |
| 3,005,357 | 10/1961 | Christian | 74—421.5 |

DAVID J. WILLIAMOWSKY, *Primary Examiner.*

L. H. GERIN, *Assistant Examiner.*